Patented Aug. 31, 1943

2,328,193

UNITED STATES PATENT OFFICE 2,328,193

VEGETATIVE PROPAGATION OF PLANTS

Lyman Chalkley, Brick Township, Ocean County, N. J.

No Drawing. Application March 12, 1940, Serial No. 323,625

13 Claims. (Cl. 47—58)

My invention relates to a process for the vegetative propagation of plants, and especially to an improvement in the art of using plant hormones for this purpose.

In 1933 F. Laibach described a method for the application of auxins to plants in such a way that the auxins exerted their effects through the intact epidermis of the plants. The essence of his method was the use of an oily medium, especially lanolin, as the carrier of the auxin. ("Versuche mit Wuchsstoffpaste," Berichte der deutschen Botanischen Gesellschaft, volume 51, pages 386–392.) In 1934 F. Laibach, G. Mai, and A. Müller reported that auxins applied in lanolin promoted the formation of callus ("Ueber ein Zellteilungshormon," Die Naturwissenschaften, volume 22, page 288); and later publications from the same laboratory showed that roots were formed by auxins applied in lanolin (F. Laibach, A. Müller and W. Schafer, "Ueber wurzelbildende Stoffe," Die Naturwissenschaften, volume 22, pages 588–589 (1934); F. Laibach, "Ueber die Auslösung von Kallusund Wurzelbildung durch β Indolylessigsäure," Berichte der deutschen Botanischen Gesellschaft, volume 53, page 359–364 (1935)).

The formation of callus and roots on intact plants as a result of the application of auxins in oily media supplies a simple method for the vegetative propagation of plants. For the calloused or rooted portion when cut from the original plant constitutes an almost-rooted or completely rooted cutting. Since the publication of Laibach's method this procedure has been used to some extent for the propagation of plants, especially of the herbaceous types. However, this procedure is erratic and not dependable. Often callus-and-root formation do not follow the auxin application. For example, twelve Kalanchoe blossfeldiana plants in six different green houses were all treated with the same auxin preparation at the same time of the year. Only two plants developed roots as a result of this treatment.

An important object of my invention is to improve the propagation procedure based upon the Laibach method of application of the auxins so as to obtain a consistently high callus formation and root formation response.

I have found that the failure of roots to form after the application of the auxin is generally due to the action of light, and that the root forming action of the hormone is inhibited by strong illumination of the plant. The inhibiting action of light is especially strong when those portions of the plant above the treated part, i. e., on the other side of the point of application of the auxin from the roots of the plant, are illuminated. The inhibiting action of light is dependent upon the intensity of the light and also upon the species of the plant. A given intensity of light has a greater inhibiting action upon auxin treated shade plants than upon auxin treated sun plants.

Plants kept under conditions of illumination which are optimum for assimilation, flowering and fruiting are seldom very responsive to the root initiating action of auxins applied by the Laibach method. To bring about callus formation and rooting I find it desirable to reduce the irradiation of auxin treated plants substantially below the levels that are optimum for healthy growth. This reduction in irradiation requires a positive action, since a healthy plant, i. e., one that has had enough light to assimilate, flower and fruit freely, should not be maintained under these healthy light conditions while undergoing the root formation stimulated by the applied auxin; but should be removed to a position of lower illumination, or have its illumination reduced by diffusing screens or other positive means.

My process based upon this discovery comprises: (1) application of a preparation of an auxin in an oily base to a portion of an intact healthy plant which would be suitable for use as a cutting; (2) reduction in the luminous radiation supplied the treated plant, or at least those parts growing above the point of application of the auxin, to a value substantially below that which is optimum for assimilation and healthy growth of the plant; and, (3) removal of the treated portion to form a cutting.

In this process I select a portion of a growing plant which would be suitable for use as a cutting. This may be a leaf, stem or some other part commonly used by propagators for cuttings, and varies with the species and formation of the plant. The auxin preparation is applied to a point on this portion of the plant where roots are desired. The luminous radiation supplied to the plant, or at least to those parts above the point of application of the auxin, is reduced to a value substantially below the values that are optimum for the maximum assimilation and healthy growth of the plant, and the irradiation of the plant is held at this low level until root formation, or at least callusing, has taken place. The treated portion is then cut from the parent plant and planted in soil, or in a nutrient solution, or in any other medium that would be suitable for a rooted cutting.

In this process the luminous radiation supplied to the auxin treated plant should preferably be such that the average daily illumination will not be more than three times the compensation point illumination value for the leaves growing above the point of application of the auxin. By average daily illumination I mean total number of lux-hours of radiation supplied in a day divided by 24. It is this value which, preferably, should not be greater than three times the compensation point illumination. For example, a sun plant with a compensation point of 900 lux should have an average daily illumination of not over 2700 lux; or a shade plant with a compensation point of 150 lux should have an average daily illumination of not over 450 lux.

Compensation point illumination is that intensity of illumination of a plant at which photosynthesis and respiration are so balanced that carbon dioxide is neither absorbed nor given up by the plant.

The total number of lux hours of radiation falling during a day on the place where the plant is stationed may be determined by continuous measuring devices; or, since only a maximum value is required, it may be easily obtained with sufficient accuracy by hourly measurements of illumination made on one clear day with a photoelectric cell at the position of the plant in the green house. The integral from midnight to midnight of these hourly measurements of illumination will give the total number of lux hours of irradiation for the day, and $\frac{1}{24}$ of this represents the average daily illumination.

The irradiation of the treated plant may be reduced so as to give an average daily illumination of not more than three times the compensation point value by the use of diffusing screens, by reduction in the number of hours of exposure to sunlight or daylight, or any other suitable means.

The three times the compensation point limit for the average daily illumination is a maximum figure. Lower levels of average daily illumination are quite satisfactory and the treated plant may be kept in complete darkness during the initiation of roots with excellent results.

The auxin treated plant is held under reduced illumination until callusing, and, preferably, rooting has taken place. In the case of herbaceous plants, with which this process is particularly valuable, roots usually appear in from 8 to 20 days, inclusive, after the application of the auxin.

The auxin preparation which I use in my process has an oily base as distinguished from an aqueous type of base. This oily base may be composed of oils, fats, or waxes, such as olive, palm, cocoanut, corn, castor, or mineral oils; lard, lanolin, tallow, or petroleum jelly; or mixtures of these. A very suitable oily medium is obtained from mixtures of lanolin and vegetable oils. Such a mixture containing from 25% to 75% of vegetable oil is easier to apply to the plant than pure lanolin, and also a given quantity of auxin has a greater hormone activity when applied in a lanolin-oil mixture than in pure lanolin.

The concentration of auxin in the oily medium should be above the threshold of root forming activity, or more than 10,000,000 avena units of auxin per gram of oily medium. The avena units are those of Kögl and Haagen Smit described in Proceedings of the Koninklijke Akademie van Wetenschappen te Amsterdam, volume 34, pages 1411–1416 (1931). The upper limit of auxin concentration I consider to be that at which the stunting effect of the auxin upon the growth (as distinct from initiation) of roots results in serious deformation of the roots and inhibition of their growth, or about 250,000,000 avena units of auxin per gram of oily medium.

Examples of suitable auxin preparations are:

Example No. 1

|  | Grams |
|---|---|
| Anhydrous lanolin | 100 |
| (Indolyl-3)-acetic acid | 0.5 |

The lanolin is melted at 60° C. and the indolyl acetic acid mixed with it thoroughly while the lanolin cools.

Example No. 2

|  | Grams |
|---|---|
| Anhydrous lanolin | 50 |
| Castor oil | 50 |
| Gamma-(indolyl-3)-n-butylic acid | 0.25 |

The lanolin and castor oil are warmed to 60° C. and the indolyl butyric acid stirred in.

While such simple auxin preparations as illustrated above are quite suitable for my process, I have found that improved results can be obtained if the preparation contains thiamin as well as auxin. In the presence of thiamin the growth of roots initiated by the auxin is markedly stimulated. From 3 international units of thiamin per gram of oily medium to 200 international units of thiamin per gram of oily medium is satisfactory. Examples of such thiamin combinations are:

Example No. 3

| Anhydrous lanolin | grams | 50 |
|---|---|---|
| Castor oil | do | 50 |
| (Indolyl-3)-acetic acid | do | 0.25 |
| Crystalline thiamin | microgram | 1 |

The indolyl acetic acid is dissolved in the castor oil, this solution is mixed with the lanolin and thiamin, and the whole warmed to 50° C. and mixed well and cooled.

Example No. 4

| Anhydrous lanolin | grams | 50 |
|---|---|---|
| Castor oil | do | 50 |
| Gamma-(indolyl-3)-n-butyric acid | do | 0.25 |
| Crystalline thiamin | microgram | 1 |

The indolyl butyric acid is dissolved in the castor oil, this solution mixed with the lanolin, the whole warmed to 60° C. the thiamin added and the mixture stirred until cold.

Example No. 5

| Anhydrous lanolin | grams | 100 |
|---|---|---|
| Alpha naphthyl-acetic acid | do | 0.1 |
| Aqueous extract of yeast | cc | 0.1 |

The lanolin is heated to 60° C., stirred well with the alpha naphthyl-acetic acid and allowed to cool. The yeast extract is then worked into the cold lanolin. From 0.01 cc. to 1.00 cc. of yeast extract may be substituted for the 0.1 cc. indicated above.

Example No. 6

| Lard | grams | 100 |
|---|---|---|
| (Indolyl-3)-acetonitrile | do | 0.5 |
| Thiamin | microgram | 1 |

The lard is melted, and the nitrile and thiamin mixed in thoroughly as the lard cools.

*Example No. 7*

| | | |
|---|---|---|
| Anhydrous lanolin | grams | 35 |
| Olive oil | do | 65 |
| Methyl (indolyl-3)-acetate | do | 0.25 |
| Thiamin | microgram | 1 |

The methyl indolylacetate is dissolved in the olive oil, this solution is mixed with the lanolin, the whole warmed to 60° C. and the thiamin stirred in as the mixture cools.

*Example No. 8*

| | | |
|---|---|---|
| Anhydrous lanolin | grams | 75 |
| Corn oil | do | 25 |
| Gamma-(indolyl-3)-n-butyric acid | do | 0.3 |
| Thiamin | micrograms | 10 |

The lanolin, corn oil and indolyl butyric acid are mixed, warmed with stirring to 80° C., the thiamin added and the mixture stirred until it is cold.

While specific quantities have been given in these examples, these quantities are not critical. In general, in these formulae the weight of auxin may lie between 0.08 gram and 1.0 gram per 100 grams of oily medium; the weight of thiamin may lie between 0.1 and 10 micrograms of thiamin per 100 grams of oily medium, and, where the oily medium is a mixture of lanolin and vegetable oil, the proportions may lie between 25% and 75% by weight of lanolin and 75% and 25% of vegetable oil. In place of crystalline thiamin, thiamin adsorbed on inert carriers, or impure vitamin B concentrates from yeast or other sources may be used, quantities being based on the assay of pure thiamin in the product.

Suitable auxin preparations for my process are by no means limited to the examples given above, and may contain additional elements, such as vitamin $B_6$, nicotinic acid, additional oils, combinations of 2 or more auxins, etc.

I claim as my invention:

1. A process for the vegetative propagation of plants comprising the following steps: application of an auxin in an oily medium to a portion of an intact healthy plant which is suitable for use as a cutting; reduction in the average daily illumination of at least those parts of the plant above the point of application of the auxin to a level substantially below that which is optimum for assimilation and healthy growth; removal of the auxin treated portion from the parent plant to form a cutting.

2. A process for the vegetative propagation of plants comprising the following steps: application of an auxin in an oily medium to a portion of an intact healthy plant which is suitable for use as a cutting; reduction in the average daily illumination of at least those parts of the plant above the point of application of the auxin to a level substantially below that which is optimum for assimilation and healthy growth, such reduced illumination being maintained for from 8 to 20 days; removal of the auxin treated portion from the parent plant to form a cutting.

3. A process for the vegetative propagation of plants comprising the following steps: application of an auxin in an oily medium to a portion of an intact healthy plant which is suitable for use as a cutting; reduction in the average daily illumination of at least those parts of the plant above the point of application of the auxin to a value not greater than 3 times the compensation point illumination, such reduced illumination being maintained for from 8 to 20 days; removal of the treated portion from the parent plant to form a cutting.

4. A process for the vegetative propagation of plants comprising the following steps: application of an auxin in an oily medium to a portion of an intact healthy plant which is suitable for use as a cutting; reduction in the illumination of at least those parts of the plant above the point of application of the auxin substantially to zero for a period of from 8 to 20 days; removal of the auxin treated portion from the parent plant to form a cutting.

5. A process for the vegetative propagation of plants comprising the following steps: application of an auxin in an oily medium to a portion of an intact healthy plant which is suitable for use as a cutting; reduction in the average daily illumination of at least those parts of the plant above the point of application of the auxin to a level substantially below that which is optimum for assimilation and healthy growth, such reduced illumination being maintained until roots have formed in the region of the point of application of the auxin; removal of the rooted portion from the parent plant to form a rooted cutting.

6. A process for the vegetative propagation of plants comprising the following steps: application of an auxin in an oily medium to a portion of an intact healthy plant which is suitable for use as a cutting; reduction in the average daily illumination of at least those parts of the plant above the point of application of the auxin to a value not greater than 3 times the compensation point illumination, such reduced illumination being maintained until roots have formed in the region of the point of application of the auxin; removal of the rooted portion from the parent plant to form a rooted cutting.

7. A process for the vegetative propagation of plants comprising the following steps: application of an auxin in an oily medium to a portion of an intact healthy plant which is suitable for use as a cutting; reduction in the illumination of at least those parts of the plant above the point of application of the auxin substantially to zero until roots have formed in the region of the point of application of the auxin; removal of the rooted portion from the parent plant to form a rooted cutting.

8. That step in the vegetative propagation of an auxin treated plant which until the time of application of the auxin had been subjected to conditions of illumination proper for the healthy growth of the plant, consisting in holding for a period of 8 to 20 days the average daily illumination of at least those parts of the plant above the point of application of the auxin to values substantially below those which are optimum for assimilation and healthy growth of the plant.

9. That step in the vegetative propagation of an auxin treated plant which until the time of application of the auxin had been subjected to conditions of illumination proper for the healthy growth of the plant, consisting in holding for a period of 8 to 20 days the average daily illumination of at least those parts of the plant above the point of application of the auxin to values which do not exceed 3 times the compensation point illumination.

10. That step in the vegetative propagation of an auxin treated plant which until the time of application of the auxin had been subjected to conditions of illumination proper for the healthy growth of the plant, consisting in the maintenance of at least those parts of the plant above the point of application of the auxin in darkness for a period of 8 to 20 days.

11. That step in the vegetative propagation of an auxin treated plant which until the time of application of the auxin had been subjected to conditions of illumination proper for the healthy growth of the plant, consisting in holding until rooting occurs the average daily illumination of at least those parts of the plant above the point of application of the auxin to values substantially below those which are optimum for assimilation and healthy growth of the plant.

12. That step in the vegetative propagation of an auxin treated plant which until the time of application of the auxin had been subjected to conditions of illumination proper for the healthy growth of the plant, consisting in holding until rooting occurs the average daily illumination of at least those parts of the plant above the point of application of the auxin to values which do not exceed three times the compensation point illumination.

13. That step in the vegetative propagation of an auxin treated plant which until the time of application of the auxin had been subjected to conditions of illumination proper for the healthy growth of the plant, consisting in the mantenance of at least those parts of the plant above the point of application of the auxin in darkness until rooting occurs.

LYMAN CHALKLEY.